Sept. 23, 1947.  M. REBUFFONI  2,427,744
CONTROL SYSTEM
Filed April 30, 1945
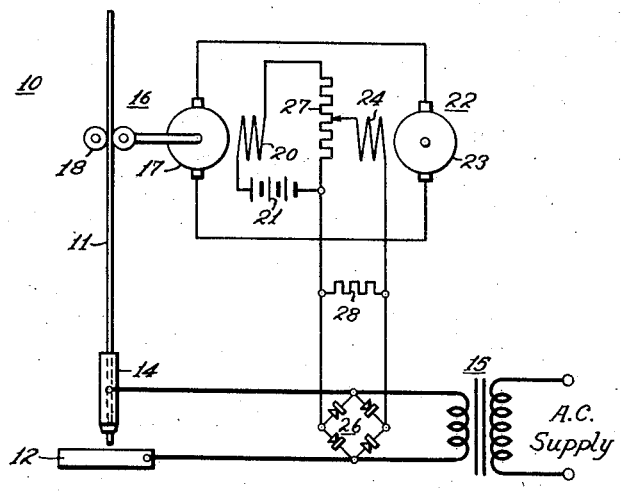
WITNESSES:
Edward Michael
F. V. Giolma
INVENTOR
Martin Rebuffoni.
BY
G. M. Crawford
ATTORNEY Patented Sept. 23, 1947

2,427,744

UNITED STATES PATENT OFFICE 2,427,744

CONTROL SYSTEM

Martin Rebuffoni, Wilkinsburg, Pa., assignor to Westinghouse Electric Corporation, East Pittsburgh, Pa., a corporation of Pennsylvania Application April 30, 1945, Serial No. 591,081

3 Claims. (Cl. 314—75)

My invention relates, generally, to control systems and has reference, in particular, to electrode control systems for automatic arc welding.

Generally stated, it is an object of my invention to provide a control system for an electrode feed motor in an arc welding system, which is both simple and inexpensive to manufacture and is reliable in operation.

More specifically, it is an object of my invention to provide for reversibly operating a direct-current electrode feed motor in accordance with an arc characteristic in either a direct current or an alternating-current arc-welding system.

Another object of my invention is to provide for improving the operating characteristics of an electrode feed motor in an alternating-current arc-welding system.

Yet another object of my invention is to provide a path for a reversing current through the field winding of a direct-current electrode feed motor, which is energized from a rectifier circuit which may be connected to either an alternating-current or a direct current arc-welding circuit.

It is also an object of my invention to provide for improving the performance of a direct-current electrode feed motor in a universal arc-welding system for use with either direct or alternating current by reducing the resistance in the armature circuit.

Still another object of my invention is to provide for reducing the time lag of a direct-current electrode feed motor in responding to variations of the arc voltage in an alternating-current arc-welding system.

Other objects will in part be obvious, and will in part be explained hereinafter.

In accordance with one embodiment of my invention, the armature of the direct-current electrode feed motor in an alternating-current arc-welding system is connected directly across the armature of the feed motor control generator. Control of the feed motor, in response to variations in the voltage of the alternating-current arc, is obtained by connecting the control generator field winding between a source of direct-current and the direct-current terminals of a rectifier bridge circuit connected to the arc-welding circuit, the source and the bridge circuit being in opposed relation. A shunt by-pass resistor connected across the direct-current terminals of the rectifier bridge circuit provides a path for a reverse current through the field winding of the control generator whenever the arc voltage drops below a predetermined value.

For a more complete understanding of the nature and objects of my invention, reference may be made to the following detailed description, which may be studied in connection with the accompanying drawing in which the single figure is a diagrammatic view of a universal arc-welding system embodying the invention in one of its forms.

Referring to the drawing, the reference numeral 10 may denote, generally, a universal automatic arc-welding system wherein an electrode 11 is disposed to be maintained in proper arcing relation with work 12 upon which a welding operation is to be performed. Welding current may be supplied to the electrode 11 through a suitable nozzle 14 from a suitable source of alternating current through a transformer 15.

In order to maintain the electrode 11 in the proper arcing relation with the work 12, a direct-current electrode feed motor 16 may be utilized having an armature 17, which may be operatively connected to feed the electrode 11 by means of rolls 18. The field winding 20 of the feed motor 16 may be energized from any source of direct-current which may be represented by the battery 21.

In order to effect operation of the feed motor 16 in accordance with the characteristics of the arc between the electrode 11 and work 12, a control generator 22 having a field winding 24 may be provided. In this instance the armature 23 of its generator is connected directly to the armature 17 of the feed motor.

For the purpose of controlling the feed motor 16 in accordance with characteristics of the arc, the field winding 24 of the control generator may be connected for energization to a source of voltage which is responsive at least in part to the voltage between the electrode 11 and work 12. For example, the field winding 24 may be connected so as to be energized by a direct-current voltage produced by a rectifier bridge circuit 26 connected between the electrode 11 and the work 12, and by a substantially constant voltage which may be obtained from an adjustable voltage divider 27 connected to the direct-current source 21. The voltages from the rectifier bridge circuit 26 and the source 21 may be applied to the field winding 24 in opposite relation so that when the arc voltage becomes too great, the voltage from the rectifier bridge circuit 26 predominates and the feed motor 16 is operated to feed the electrode 11 toward the work 12 at an increased rate.

In order to provide a path for a reverse current through the field winding 24 from the voltage divider 27 to retract the electrode 11 from the work when the arc voltage becomes too low, means such as the control or by-pass resistor 28 may be connected in shunt circuit relation with the direct-current terminals of the rectifier bridge circuit 26. With a range of arc voltages on the order of 20-40 the resistor 28 may, for example, be approximately 12 to 15 ohms.

In operation, when voltage is applied to the welding transformer 15, the voltage produced by the rectifier bridge circuit 26 predominates over the voltage produced by the voltage divider 27, and the control generator 22 operates the feed motor 16 to feed the electrode 11 toward the work 12. Upon contact of the electrode 11 with the work 12, the voltage produced by the rectifier bridge circuit 26 is greatly reduced, and the voltage produced by the voltage divider 27 predominates. Accordingly, the control generator 22 operates the feed motor 16 in the reverse direction to withdraw the electrode 11 from the work 12, striking an arc therebetween. If the arc voltage varies during welding, the differential between the direct-current voltages produced by the rectifier bridge circuit and the voltage divider 27 varies in value and in direction so that the feed motor 16 is operated to maintain substantially constant arcing conditions. Since the armature 17 of the feed motor 16 is directly connected across the armature 23 of the control generator 22, the resistance of this circuit is at a minimum and the feed motor develops its maximum torque. Accordingly, the time lag of the feed motor in following changes in the arc characteristics is reduced to a minimum.

From the above description and the accompanying drawing, it will be apparent that I have provided in a simple and effective manner for improving the operating characteristics of a direct-current electrode feed motor in an alternating-current arc-welding system. By connecting the feed motor and the control generator in the manner hereinbefore described, the relatively high torque characteristics of the direct-current feed motor are utilized to a maximum when welding with either direct current or alternating current. At the same time, the simplicity of this type of control system is retained, providing a system which is easy to operate and inexpensive to maintain.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. For use in controlling the operation of a direct-current motor having a field winding and an armature connected for feeding an electrode in either a direct current or an alternating-current arc-welding circuit, a control generator connected to supply electrical energy to the feed motor, circuit means including a potentiometer connecting the field winding to a direct-current source of substantially constant voltage, means including a rectifier device connected to apply to the control generator field winding a direct-current voltage proportional to the voltage of the arc circuit and in opposition to a substantially constant control voltage from the potentiometer, and means connected in circuit relation with the control generator field winding and the potentiometer to provide a path through the field winding for a reverse current from the source.

2. A universal automatic arc-welding system comprising, an electrode feed motor having a field winding and an armature connected for reversibly feeding a welding electrode toward or away from a workpiece in either a direct current or an alternating-current arc-welding circuit, means including a control resistor connecting the field winding of the motor to a source of direct current, a control generator having an armature directly connected in circuit relation with the feed motor armature and a field winding, a rectifier bridge circuit connected to produce a direct current voltage substantially proportional to the voltage between the electrode and the work, and circuit means including a shunt impedance connected between the control generator field winding and the rectifier bridge circuit for energizing the field winding in opposite senses by applying thereto the differential voltage between the voltage of the rectifier bridge circuit and a substantially constant voltage from the source.

3. In a control system for a reversible direct-current feed motor having an armature connected for feeding an electrode to maintain an alternating-current arc with a workpiece, a direct-current control generator having a field winding and an armature connected directly across the feed motor armature, adjustable voltage dividing means for providing a substantially constant control voltage of different predetermined values, rectifier means connected between the electrode and the work for producing a direct-current control voltage proportional to the voltage between the electrode and the work, circuit means connecting the rectifier means and the voltage dividing means to the field winding of the control generator in opposed relation, and a control resistor shunting the rectifier means to provide a path for a reverse current through the field winding from the voltage dividing means.

MARTIN REBUFFONI.

REFERENCES CITED

The following references are of record in the file of this patent:

UNITED STATES PATENTS

| Number | Name | Date |
| --- | --- | --- |
| 2,311,462 | Neal | Feb. 16, 1943 |
| 714,360 | Buck | Nov. 25, 1902 |
| 1,749,304 | Scheppmann et al. | Mar. 4, 1930 |
| 1,915,050 | Coldwell | June 20, 1933 |
| 2,216,596 | McCarty | Oct. 1, 1940 |
| 2,301,689 | Edwards et al. | Nov. 10, 1942 |
| 2,357,087 | Alexanderson | Aug. 29, 1944 |